(12) United States Patent
Kazar et al.

(10) Patent No.: US 8,248,409 B2
(45) Date of Patent: Aug. 21, 2012

(54) POINT IN POLYHEDRON

(75) Inventors: Baris M. Kazar, Nashua, NH (US); Siva Ravada, Nashua, NH (US); Ravi Kothuri, Nashua, NH (US)

(73) Assignee: Oracle International Corporation, Redwood Shores, CA (US)

(*) Notice: Subject to any disclaimer, the term of this patent is extended or adjusted under 35 U.S.C. 154(b) by 971 days.

(21) Appl. No.: 12/287,835

(22) Filed: Oct. 14, 2008

(65) Prior Publication Data

US 2010/0091016 A1 Apr. 15, 2010

(51) Int. Cl.
G06T 17/00 (2006.01)
G06T 15/40 (2011.01)
G06F 7/00 (2006.01)
G06F 17/30 (2006.01)

(52) U.S. Cl. .......... 345/420; 345/421; 707/705

(58) Field of Classification Search .......... 345/420, 345/421; 707/705
See application file for complete search history.

(56) References Cited

OTHER PUBLICATIONS

Feito et al., Inclusion test for general polyhedra, Computers & Graphics, vol. 21, Issue 1, Jan.-Feb. 1997, pp. 23-30.*
Kothuri et al., "Pro Oracle Spatial", Nov. 2004, Apress, pp. 21-32.*
Chen et al., Efficient and Consistent Algorithms for Determining the Containment of Points in Polygons and Polyhedra, Proceedings of Eurographics '87, 1987, pp. 423-437.*
Ogayar et al., Point in solid strategies, Computers & Graphics, vol. 29, Issue 4, Aug. 2005, pp. 616-624.*
Miras et al., Inclusion test for curved-edge polygons, Computers & Graphics, vol. 21, Issue 6, Nov.-Dec. 1997, pp. 815-824.*
Torres et al., Orientation, simplicity, and inclusion test for planar polygons, Computers & Graphics, vol. 19, Issue 4, Jul.-Aug. 1995, pp. 595-600.*
Jagadish, H.V., Spatial search with polyhedra, Proceedings. Sixth International Conference on Data Engineering, 1990, pp. 311-319, Feb. 5-9, 1990.*
Matousek et al., On ray shooting in convex polytopes, Discrete & Computational Geometry, vol. 10, Issue 1, 1993, pp. 215-232.*

* cited by examiner

*Primary Examiner* — James A Thompson
*Assistant Examiner* — Jed-Justin Imperial
(74) *Attorney, Agent, or Firm* — Kraguljac Law Group LLC

(57) ABSTRACT

Systems, methods, and other embodiments associated with determining whether a point is located in a polyhedron are described. One example method includes identifying a ray that connects a query point to a second point located outside a minimum bounding volume of a solid polyhedron without intersecting a vertex of the solid polyhedron. The method includes counting crossings of planar faces of the solid polyhedron by the ray. The crossings may be mid-face crossings, edge crossings, and/or coplanar crossings. The crossings are selectively counted based on whether the ray actually crosses a face, grazes a face without crossing it, or runs coplanar with a face without crossing another face. The method includes controlling an automated process based on whether first point is inside the solid polyhedron.

20 Claims, 8 Drawing Sheets

US 8,248,409 B2

POINT IN POLYHEDRON

CROSS REFERENCE TO RELATED APPLICATIONS

This application is related to the following U.S. patent application, which is assigned to the present assignee: "Three Dimensional Surface and Solid Query Processing", Ser. No. "12/152,147" filed May 13, 2008, by the same inventors.

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

Data describing objects in three dimensions continues to be acquired. Uses for this data continue to increase. One use for three dimensional data is to determine relationships between objects. For example, it may be useful to know how far a first object is from a second object. Similarly, it may be useful to know whether a first object intersects a second object. It may also be useful to know whether a first object is inside another object. For example, it may be useful to know whether a probe is located inside a tumor or outside a tumor. Similarly, it may be useful to know whether a certain container is located on a dock or inside a ship.

Conventionally, this "point in polyhedron" problem has been addressed using random ray shooting. In random ray shooting, random points located outside the polyhedron are identified and a ray is shot from a query point, the point for which the inside/outside polyhedron determination is desired, to the random points. A "face crossing" algorithm may count the number of faces crossed by the ray to determine whether the query point is inside the polyhedron. If the ray intersects a vertex it is discarded and another random point may be selected. A finite number of random rays may be produced and analyzed, if they are even analyzed at all. Thus, face crossing algorithms may not be deterministic due to special cases that are not handled by conventional random ray shooting approaches.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
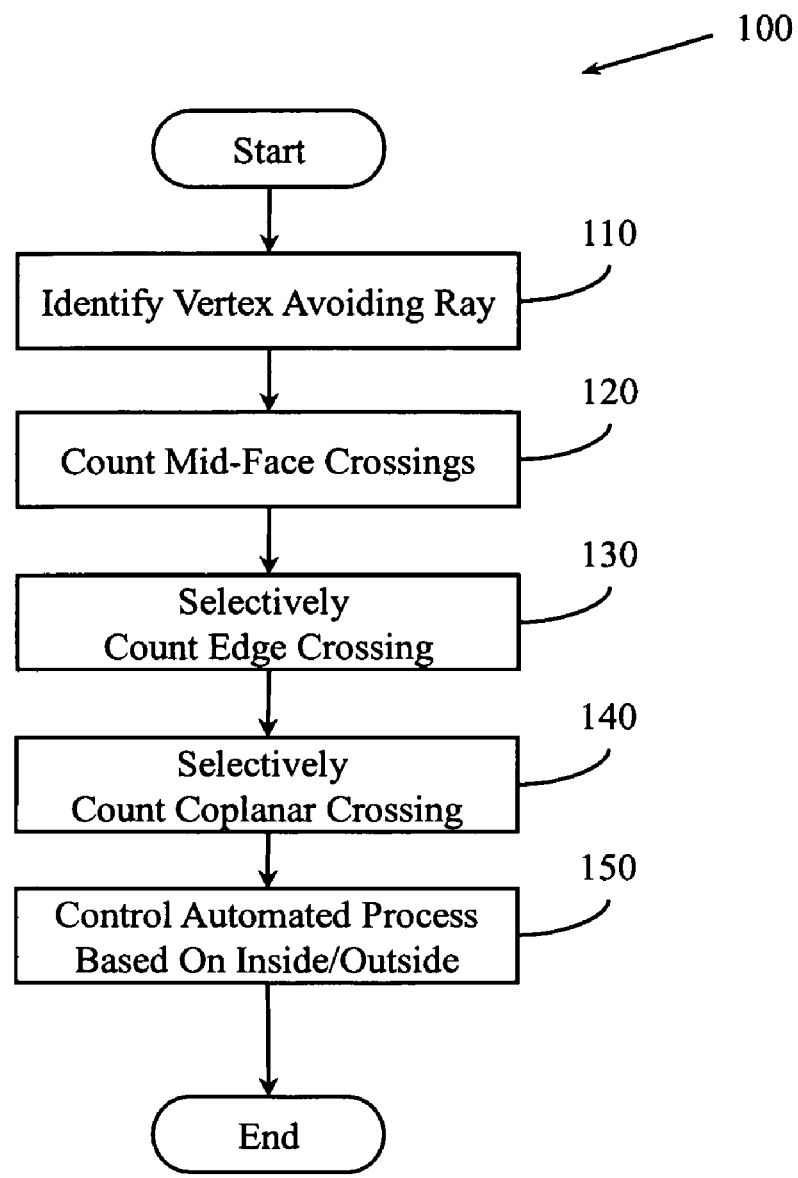
FIG. 1 illustrates an example method associated with determining whether a point is inside a polyhedron.

Example systems and methods described herein operate on data describing a point and a solid polyhedron. The question to be determined is whether the point resides inside the solid polyhedron. A point that resides on a face of the polyhedron or at a vertex of the polyhedron may be defined as being outside the polyhedron. Example systems and methods determine whether the point is inside the solid polyhedron based on a number of faces of the polyhedron crossed by a vertex avoiding ray. Example systems and methods consider special cases involving coplanar faces, edge intersections, and so on, that conventional systems may not consider.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
USB: universal serial bus.
WAN: wide area network.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a data structure (e.g. a list, a queue, a heap, a tree) a memory, a register, and so on. In different examples, a data store may reside in one logical and/or physical entity and/or may be distributed between two or more logical and/or physical entities.

"Logic", as used herein, includes but is not limited to hardware, firmware, and software embodied on a computer-readable medium, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, and so on, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, logics, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is to be appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates a method 100 associated with determining whether a point is in a polyhedron. In one example, method 100 may determine whether the point is inside the solid polyhedron based on a number of crossings of planar faces of the solid polyhedron by a vertex avoiding ray. In one example, a crossing of a planar face may be a mid-face crossing, an edge crossing, or a coplanar crossing. A mid-face crossing is a crossing in which the vertex avoiding ray intersects a face but does not intersect an edge of the face and is not coplanar with the face. An edge crossing is a crossing in which the vertex avoiding ray intersects an edge of a face. A coplanar crossing is a crossing in which the vertex avoiding ray intersects with and is coplanar to a face. While a mid-face crossing may simply be counted as a crossing, additional analysis may be involved in determining whether an edge crossing or a coplanar crossing are counted as face crossings.

Method 100 may include, at 110, identifying a ray that connects a first point to a second point that is located outside a minimum bounding volume (MBV) of the solid polyhedron. The ray will be crafted to insure that it does not intersect any vertex of the solid polyhedron. Thus, the ray may be referred to as a vertex avoiding ray. The first point is the point for which the point in polyhedron decision is being made.

Method 100 may also include, at 120, counting a mid-face crossing as a crossing of a planar face of the solid. The mid-face crossing may be counted to facilitate determining whether the number of faces crossed indicates that the ray is proceeding from inside the polyhedron to outside the polyhedron or from outside the polyhedron to outside the polyhedron.

Method 100 may also include, at 130, selectively counting an edge crossing as a crossing of a planar face of the solid polyhedron. The edge crossing may be counted upon determining that two planar faces of the solid polyhedron that are connected by an edge that includes a point where the vertex avoiding ray intersects the edge are not on the same side of a plane defined by the ray and the edge. Determining whether the two connected planar faces are on the same side of a plane may include establishing a reference direction and then determining whether a compass would deflect in the same relative direction to a point on the two connected planar faces with respect to the reference direction. For example, are both faces on the "east" side of a "north" reference direction.

Method 100 may also include, at 140, selectively counting a coplanar crossing as a crossing of a planar face of the solid polyhedron. The coplanar crossing may be counted upon determining that two planar faces of the solid polyhedron that are connected by a planar face that the ray intersects and with which the ray is coplanar are not on the same side of a plane defined by the coplanar face.

Method 100 may also include, at 150, controlling an automated process based on whether the first point is inside the solid polyhedron. Controlling the process may include, for example, generating an interrupt to signal the process, writing a value to a memory location or register that controls the process, initiating a process, terminating a process, providing a value upon which the automated process can make a decision, and so on.

In one example, a method may be implemented as computer executable instructions. Thus, in one example, a computer-readable medium may store computer executable instructions that if executed by a machine (e.g., processor) cause the machine to perform a method. While executable instructions associated with the above method are described as being stored on a computer-readable medium, it is to be appreciated that executable instructions associated with other example methods described herein may also be stored on a computer-readable medium.

Figure 2:
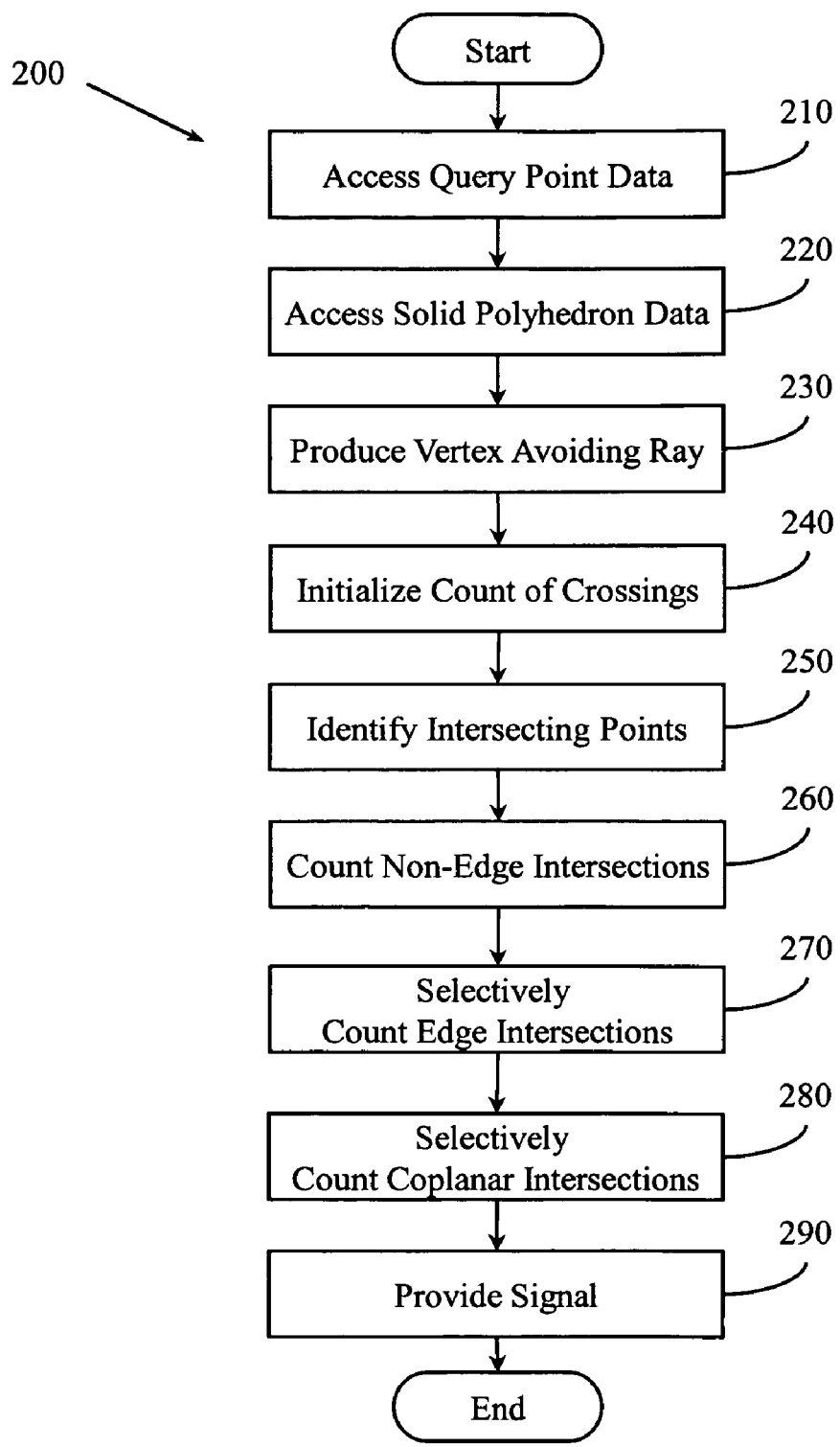
FIG. 2 illustrates an example method associated with determining whether a point is inside a polyhedron.

FIG. 2 illustrates a method 200 associated with determining whether a point is in a polyhedron. Method 200 includes, at 210, accessing data that identifies a query point (QP) to analyze. The query point is identifiable in a three dimensional space. The query point may be identifiable, for example, using x,y,z coordinates, polar coordinates from an established pole, and so on. In one example, the query point is represented by an SDO_GEOMETRY point object. The query point may represent a physical item. For example, the query point may represent the tip of a medical probe, the location of a missile, the location of a shipping container, and so on. SDO_GEOMETRY objects are described in the textbook Pro Oracle Spatial, Kothuri et al., ISBN 1-59059-383-9.

Method 200 also includes, at 220, accessing data that identifies a solid polyhedron (S) to analyze. The solid polyhedron is also identifiable in the three dimensional space. In one example, the solid polyhedron is represented by a set of boundary polygons that are in turn represented as a set of planar faces in the three dimensional space. In one example, a member of the set of planar faces has at least one edge in common with at least one other member of the set of planar faces. In one example, the solid polyhedron is represented by an SDO_GEOMETRY solid object. In one example, the SDO_GEOMETRY solid object stores a set of information describing surface boundaries of the solid polyhedron. The solid polyhedron may represent a volume of interest like a tumor, a blast envelope, a dock, a port, a container ship at a dock in a port, and so on.

Method 200 also includes, at 230, producing a vertex avoiding ray (R) that connects the query point to a point outside the minimum bounding volume (MBV) of the solid polyhedron. In one example, producing the vertex avoiding ray R includes identifying a reference line that includes the query point and that is parallel to one axis in a three dimensional frame of reference associated with the solid polyhedron. This reference line may intersect a vertex and thus this unique case is accounted for below. Producing the vertex avoiding ray R may also include producing a set of lines $L_1$ through $L_N$, N being an integer equal to the number of vertices of the solid polyhedron. A line $L_X$ is to connect the query point to a vertex $V_X$ of the solid polyhedron. Thus, all the rays that could intersect a vertex of the solid polyhedron are identified. Producing the vertex avoiding ray may also include computing a set of angles $A_1$ through $A_N$, where an angle $A_X$ describes an angle between a line $L_X$ and the reference line. Thus, all the angles leading away from the query point that intersect a vertex are accounted for. Producing the vertex avoiding ray may also include identifying an angle $A_{NOT}$ that is not in the set of angles $A_1$ through $A_N$. Since all the angles that intersect vertices are accounted for, the ray leaving the query point at the angle $A_{NOT}$ will not intersect a vertex. Producing the R may also include establishing the R as a ray that begins at the query point and travels in the direction described by $A_{NOT}$.

Method 200 also includes, at 240, initializing a count of crossing intersections to an initial value. In one example, the count may be initialized to an even number. In this example, if the total number of crossing intersections is even then the query point may be identified as being outside the polyhedron. In this example, if the total number of crossing intersections is odd, then the point may be identified as being inside the polyhedron. One skilled in the art will appreciate that different initialization and counting techniques may be employed.

Method 200 also includes, at 250, identifying a set of intersecting points where the vertex avoiding ray intersects a member of the set of planar faces. In one example, identifying the set of intersections includes analyzing the SDO_GEOMETRY point object and the SDO_GEOMETRY solid object using the ANY_INTERACT function. In this example, the ANY_INTERACT function may process a spatial index of SDO_GEOMETRY objects stored in an R-tree. The ANY_INTERACT function is described in the textbook Pro Oracle Spatial, Kothuri et al., ISBN 1-59059-383-9. With the intersection points in hand, the method 200 can then count crossings based on whether the vertex avoiding ray actually crosses a face of the solid polyhedron at the intersection or whether the ray only grazes or runs along a face without crossing the face. While method 200 illustrates acquiring the entire set of intersecting points first and then counting crossings, one skilled in the art will appreciate that crossings may be counted on-the-fly as they are detected, in small groups, and so on.

Method 200 also includes, at 260, selectively manipulating the count of crossing intersections to indicate that a crossing intersection has been encountered. In one example, the count is manipulated upon determining that a member of the set of intersecting points is on a member of the set of planar faces but not on an edge of a member of the set of planar faces. This type of intersection may be referred to as a "mid-face crossing". While "mid-face" is employed, one skilled in the art will appreciate that "mid-face" does not refer to the middle of a face, but rather refers to a non-edge point on the face.

Method 200 also includes, at 270, selectively manipulating the count of crossing intersections upon analyzing an edge crossing. The count may be manipulated upon determining that a member of the set of intersecting points is on an edge connecting two connected members of the set of planar faces and upon determining that the two connected members of the set of planar faces are not on the same side of a plane defined by the vertex avoiding ray and the connecting edge. In one example, determining that the two connected members of the set of planar faces are not on the same side of a plane defined by the vertex avoiding ray and the connecting edge includes computing compass deflections. This may include computing a first compass deflection from the query point to a non-edge point in a first of the two connected members of the set of planar faces. A compass deflection describes a direction (e.g., east, west) away from a reference direction (e.g., north) that a compass would rotate. The determining may also include computing a second compass deflection from the query point to a non-edge point in a second of the two connected members of the set of planar faces. The determining may then include identifying whether the first compass deflection and the second compass deflection are in the same relative direction with respect to the plane defined by the R and the connected edge.

Figure 7:
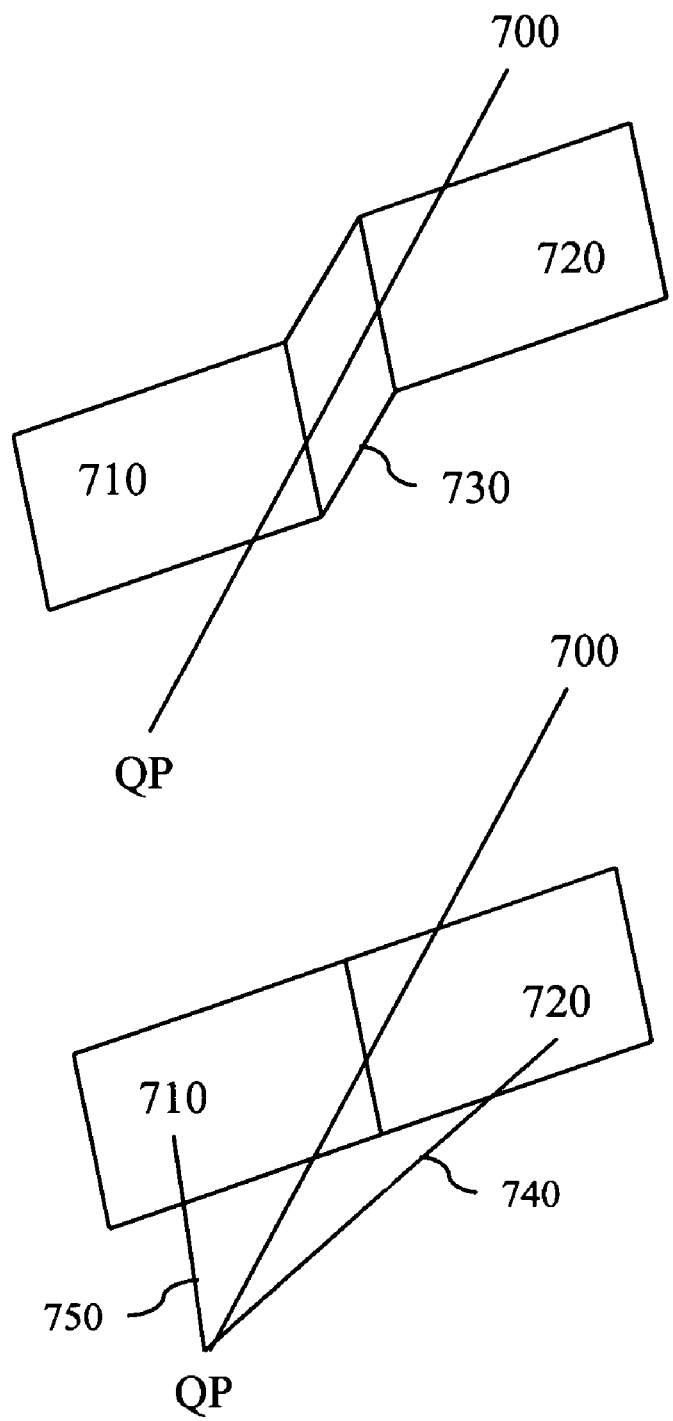
FIG. 7 illustrates two planar faces of a polyhedron that are not on the same side of a reference plane.
Figure 8:
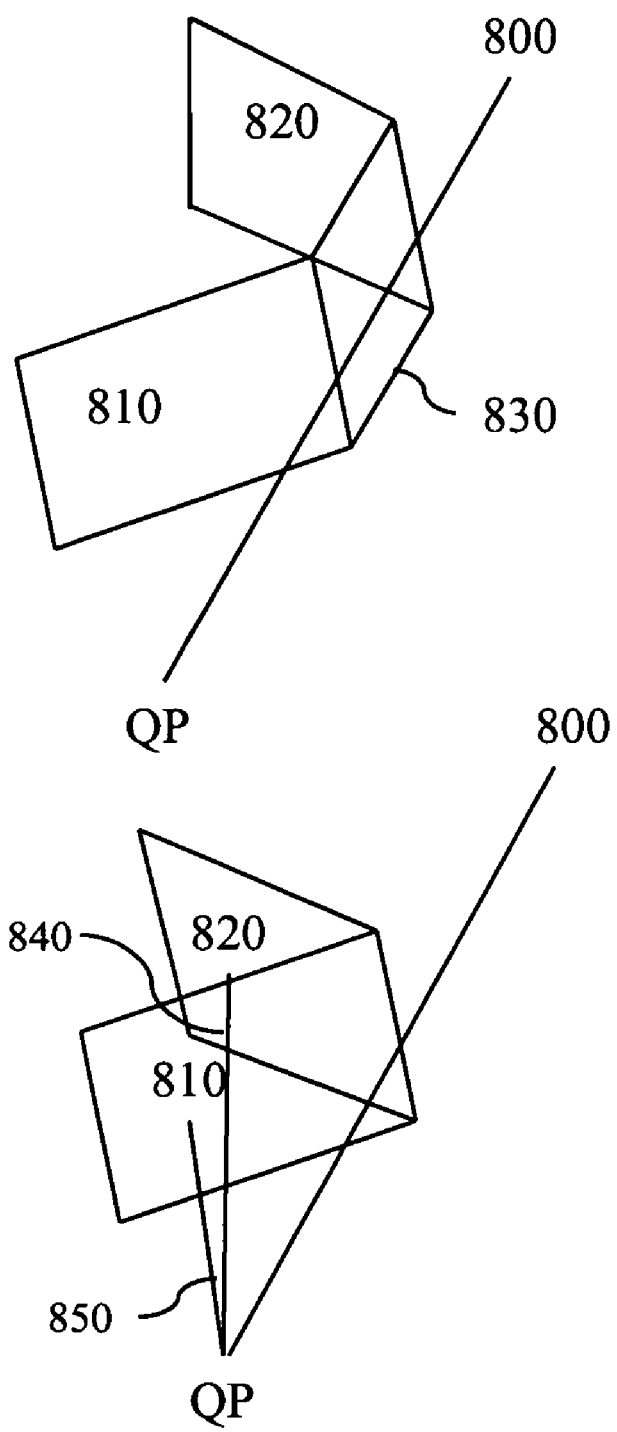
FIG. 8 illustrates two planar faces of a polyhedron that are on the same side of a reference plane.

Consider FIGS. 7 and 8. FIG. 7 illustrates faces 710 and 720, which are connected by face 730. A ray 700 has been drawn from a query point QP. Upon removing the coplanar face 730, two deflections 740 and 750 are drawn. If ray 700 is considered to point "north", then a compass deflection associated with line 740 would be "east" and a compass deflection associated with line 750 would be "west". FIG. 8 illustrates faces 810 and 820, which are connected by face 830. A ray 800 has been drawn from a query point QP. Upon removing the coplanar face 830, two deflections 840 and 850 are drawn. If ray 800 is considered to point "north", then a compass deflection associated with line 840 would be "west" and a compass deflection associated with 850 would also be "west". Examining these compass deflections facilitates determining whether a ray actually crosses a face by determining whether connected faces are on the same side of the reference direction.

Method 200 also includes, at 280, selectively manipulating the count of crossing intersections upon analyzing a coplanar intersection. The count may be manipulated upon determining that the vertex avoiding ray is coplanar with a member of the set of planar faces and upon determining that a first member of the set of planar faces and a second member of the set of planar faces that are connected by the coplanar face are not on the same side of a plane defined by the coplanar face. In one example, determining that the first member of the set of planar faces and the second member of the set of planar faces that are connected by the coplanar face are not on the same side of a plane defined by the coplanar face may include processing a sphere. The sphere processing may include centering a sphere at the point where the vertex avoiding ray intercepts the coplanar face and another face. The processing may also include partitioning the sphere into two hemispheres using the coplanar face. The radius of the sphere may be configured to insure that the sphere extends beyond the minimum bounding volume of the polyhedron. The determining may also include selecting a first non-edge point in the first member of the set of planar faces, selecting a second non-edge point in the second member of the set of planar faces, and determining whether the first non-edge point and the second non-edge point are in the same hemisphere of the sphere. A non-edge point may be selected to resolve an issue associated with taking a projection of the query point onto one of the planar faces. In one example, the projection of QP onto a coplanar face may lie on the line used as the reference line for compass deflections. Using a non-edge point rather than the projection point prevents this occurrence. In another example, determining that the first member of the set of planar faces and the second member of the set of planar faces that are connected by the coplanar face are not on the same side of a plane defined by the coplanar face may include computing compass deflections. This may include computing a first compass deflection from the query point to a non-edge point in the first member of the set of planar faces and computing a second compass deflection from the query point to a non-edge point in the second member of the planar faces. The determining may also include identifying whether the first compass deflection and the second compass deflection are in the same relative direction with respect to the plane defined by the coplanar face. Since three dimensional space is involved, the "relative direction" may be determined with respect to a selected axis or axes.

Method 200 also includes, at 290, providing a signal that indicates whether the query point is inside the solid polyhedron based, at least in part, on the count of crossing intersections. The signal may be provided as an electrical signal that controls an apparatus, as a data signal provided to a computer process, and so on. Thus the signal facilitates producing a concrete, useful, tangible result by causing a physical transformation in the receiver of the signal.

Figure 3:
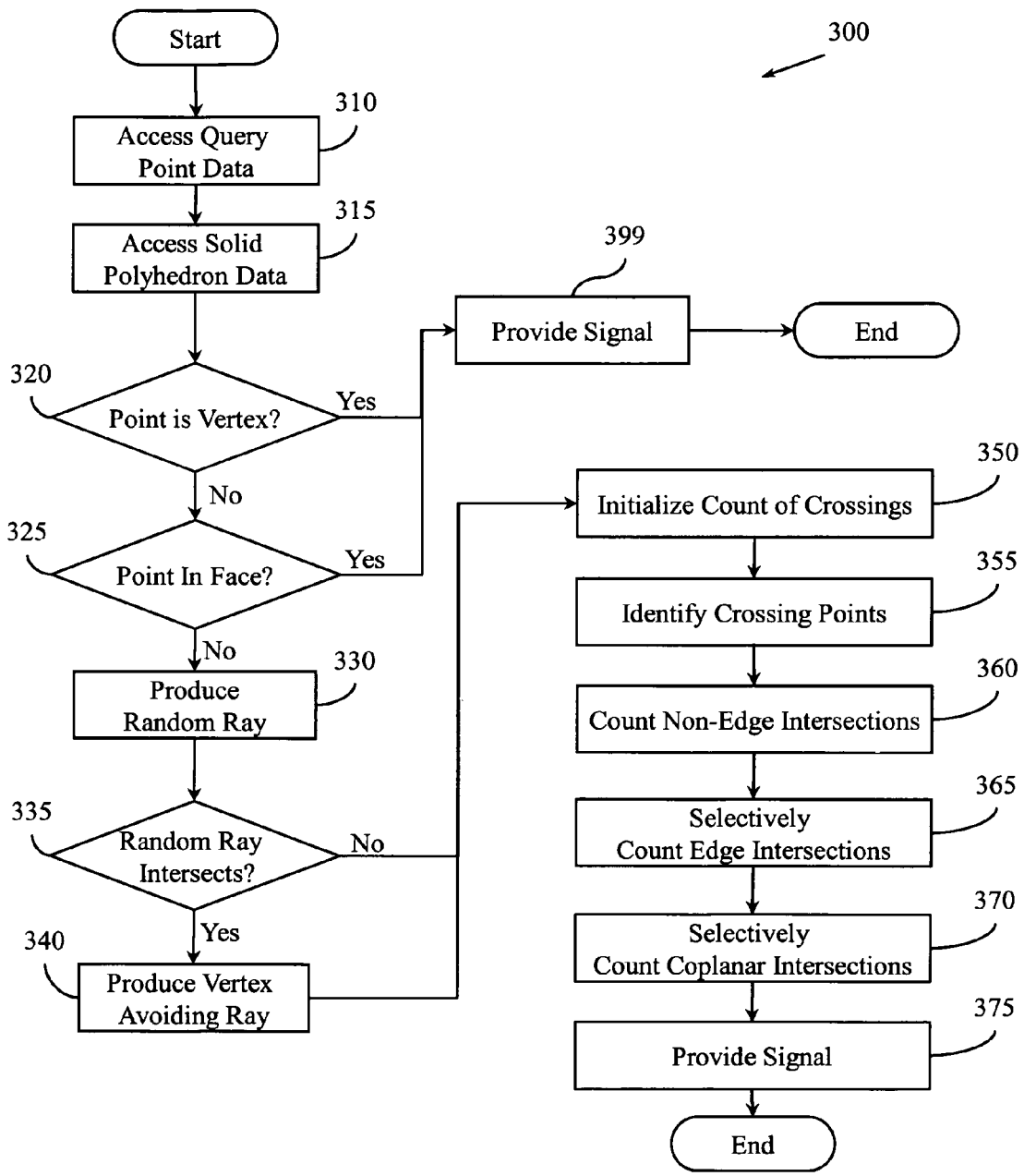
FIG. 3 illustrates an example method associated with determining whether a point is inside a polyhedron.

FIG. 3 illustrates a method 300 associated with determining whether a point is in a polyhedron. Method 300 includes several actions similar to those described in connection with method 200 (FIG. 2). For example, method 300 includes accessing query point data at 310, accessing solid polyhedron data at 315, producing a vertex avoiding ray at 340, initializing a count of crossings at 350, identifying crossing points at 355, counting non-edge intersections at 360, selectively counting edge intersections at 365, selectively counting coplanar intersections at 370, and providing a signal at 375. However, method 300 may include additional actions.

For example, method 300 may include, at 320, determining whether the query point is a vertex of the polyhedron. If the query point is a vertex of the polyhedron then method 300 may proceed, at 399, to provide a signal that the query point is not inside the polyhedron. In one example, vertex points may be defined to be outside the polyhedron. In another example, vertex points may be defined to be inside the polyhedron. In yet another example, whether the query point being a vertex point makes the point inside the polyhedron may be configurable by a user.

Method 300 may also include, at 325, determining whether the query point lies on a member of the set of boundary polygons. If the query point does lie on a boundary polygon, then method 300 may proceed, at 399, to provide a signal that the query point is not inside the polyhedron. In one example, points that lie on a boundary polygon may be defined to be outside the polyhedron. In another example, points that lie on a boundary polygon may be defined to be inside the polyhedron. In yet another example, whether the query points being on a boundary polygon makes the point inside the polyhedron may be configurable by a user.

Method 300 may not automatically spend the time and complexity of creating a special vertex avoiding ray in every case using the deterministic method. Instead, method 300 may first try to make a vertex avoiding ray by producing a random ray at 330. Producing the random ray at 330 may include identifying a random point (RP) outside the minimum bounding value of the solid polyhedron. Producing the random ray at 330 may also include identifying a ray that starts at the query point and travels toward the random point. Points along the ray may then be analyzed to determine whether they intersect a vertex. If the ray does intersect a vertex, then method 300 may proceed, at 340, to produce the vertex avoiding ray using, for example, the method described in connection with action 230 in method 200 (FIG. 2). While producing a ray in this manner is quick, producing a vertex avoiding ray in this manner is indeterminate. Therefore method 300 also includes the fully determined action of producing a vertex avoiding ray at 340. In one example, when parallel processing is available, random rays may be produced and evaluated while a vertex avoiding ray is being deterministically created. If the random ray approach turns out a vertex avoiding ray before the deterministic vertex avoiding ray approach turns out a vertex avoiding ray, then the random ray may be used and the deterministic vertex avoiding ray process terminated.

Figure 4:
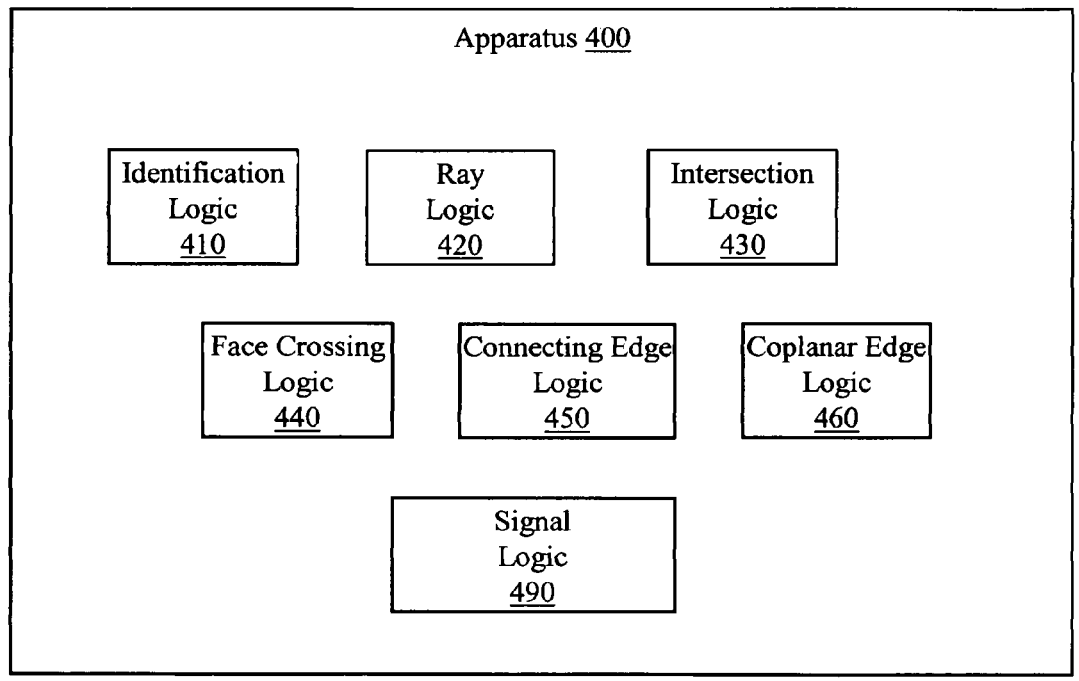
FIG. 4 illustrates an example apparatus associated with determining whether a point is inside a polyhedron.

FIG. 4 illustrates an apparatus 400 associated with determining whether a point is in a polyhedron. Apparatus 400 may include an identification logic 410 to access data that identifies a point and a solid polyhedron. In one example, the point is represented by an SDO_GEOMETRY point object and the solid polyhedron is represented by an SDO_GEOMETRY solid object. The SDO_GEOMETRY solid object may store a set a set of information describing surface boundaries of the solid polyhedron. In one example the solid polyhedron is defined by a set of boundary polygons that are represented as a set of planar faces in a three dimensional space. Because the solid polyhedron is a closed geometric shape, a member of the set of planar faces has at least one edge in common with at least one other member of the set of planar faces. Apparatus 400 is to determine whether the point is located in the solid polyhedron and to provide a signal based on the determination.

Apparatus 400 may also include a ray logic 420 that is to produce a vertex avoiding ray that starts at the point and travels to another point located outside the minimum bounding volume of the solid polyhedron. To produce a vertex avoiding ray that starts at the point and travels to another point located outside the minimum bounding volume of the solid polyhedron, the ray logic 420 identifies a reference line that includes the point and that is parallel to one axis in a three dimensional frame of reference associated with the solid polyhedron. The ray logic 420 produces a set of lines $L_1$ through $L_N$, N being an integer equal to the number of vertices of the solid polyhedron, where a line $L_X$ connects the point to a vertex $V_X$ of the solid polyhedron. Producing the line may include instantiating and populating, for example, an SDO_GEOMETRY object. While an SDO_GEOMETRY object is described, one skilled in the art will appreciate that a line may be produced in other manners. The ray logic 420 produces a line that connects the query point to each vertex of the solid polyhedron. Generating a vertex avoiding ray therefore includes picking a line that is not one of the lines that connects the query point to a vertex. In one example, the ray logic 420 therefore computes a set of angles $A_1$ through $A_N$, where an angle $A_X$ describes an angle between a line $L_X$ and the reference line. The ray logic 420 can then identify an angle $A_{NOT}$ that is not in the set of angles $A_1$ through $A_N$. With this angle $A_{NOT}$ available, the ray logic 420 can establish the vertex avoiding ray beginning at the query point and travelling in the direction described by $A_{NOT}$.

Apparatus 400 may also include an intersection logic 430 that identifies a set of intersecting points where the vertex avoiding ray intersects a member of the set of planar faces. The intersection logic 430 will also initialize a number of crossing intersections. In one example, the number of crossing intersections may be initialized to zero, to an even number, and so on. One skilled in the art will appreciate that different face counting techniques may rely on different initialization approaches. In one example, the intersection logic 430 may identify a set of intersection points before face crossings are analyzed while in another example crossing intersections may be identified while face crossings are analyzed. One skilled in the art will appreciate that identifying crossing points and analyzing the nature of the face crossing at the crossing point may be performed in various orders.

Apparatus 400 may also include a face crossing logic 440. Face crossing logic 440 will selectively update the number of crossing intersections based on a determination of whether the vertex avoiding ray actually crosses a face. The determination may be made for each member of the set of intersecting points. Face crossing logic 440 may update the number of crossing intersections when an intersecting point lies on a member of the set of planar faces but is not on an edge of a member of the set of planar faces. In this case the intersecting point is in the "middle" of the face, meaning it is not on the edge of the planar face. While the term "middle" is employed, one skilled in the art will appreciate that "middle" refers to not being on an edge.

Apparatus 400 may also include a connecting edge logic 450. Connecting edge logic 450 selectively updates the number of crossing intersections based on a determination of whether a member of the set of intersecting points is on a connecting edge of two connected members of the set of planar faces and whether the two connected members of the set of planar faces are not on the same side of a plane defined by the vertex avoiding ray and the connecting edge. This processing accounts for a degenerate case where the vertex avoiding ray grazes a face but may not actually cross the face. If the two connected faces are on the same side of a reference plane (e.g., plane defined by vertex avoiding ray and connecting edge), then the vertex avoiding ray grazes but does not cross the face. If the two connected faces are on different sides of the reference line, then the vertex avoid ray grazes and crosses the face. In one example, the connecting edge logic 450 determines whether two connected members of the set of planar faces are not on the same side of a reference plane by computing compass deflections. The connecting edge logic 450 may compute a first compass deflection from the query point to a non-edge point in a first of the two connected members of the set of planar faces and a second compass deflection from the point to a non-edge point in a second of the two connected members of the set of planar faces. The connecting edge logic 450 then determines whether the first compass deflection and the second compass deflection are in the same relative direction with respect to the plane defined by the vertex avoiding ray and the connected edge. Recall how FIG. 7 and FIG. 8 illustrate compass deflections.

Apparatus 400 may also include a coplanar edge logic 460. Coplanar edge logic 460 selectively updates the number of crossing intersections based on a determination of whether a member of the set of intersecting points is on a planar face that is coplanar with the vertex avoiding ray and whether a first member of the set of planar faces and a second member of the set of planar faces that are connected by the coplanar face are not on the same side of a plane defined by the coplanar face. In one example, the coplanar edge logic 460 determines whether two planar faces connected by the coplanar face are not on the same side of a plane defined by the coplanar face by computing compass deflections. Coplanar edge logic 460 computes a first compass deflection from the point to a non-edge point in the first member of the set of planar faces. Coplanar edge logic 460 also computes a second compass deflection from the point to a non-edge point in the second member of the planar faces. The coplanar edge logic 460 then determines whether the first compass deflection and the second compass deflection are in the same relative direction with respect to the plane defined by the coplanar face. Compass deflections are illustrated in FIG. 7 and FIG. 8.

FIG. 7 illustrates two faces (710, 720) that are connected by a face 730 that is coplanar to a ray from QP to 700. These two faces are on different sides of reference line QP-700, as illustrated by deflections 740 and 750. FIG. 8 illustrates two faces (810, 820) that are connected by a face 830 that is coplanar to a ray from QP to 800. These two faces are on the same side of reference line QP-800 as illustrated by deflections 840 and 850.

Apparatus 400 may also include a signal logic 490. Signal logic 490 provides a signal that identifies whether the point is located in the solid polyhedron based, at least in part, on the number of crossing intersections associated with the set of intersecting points. Providing the signal may include, for example, displaying a value, generating an interrupt, storing a value in a memory, and other concrete, tangible, useful results.

Figure 5:
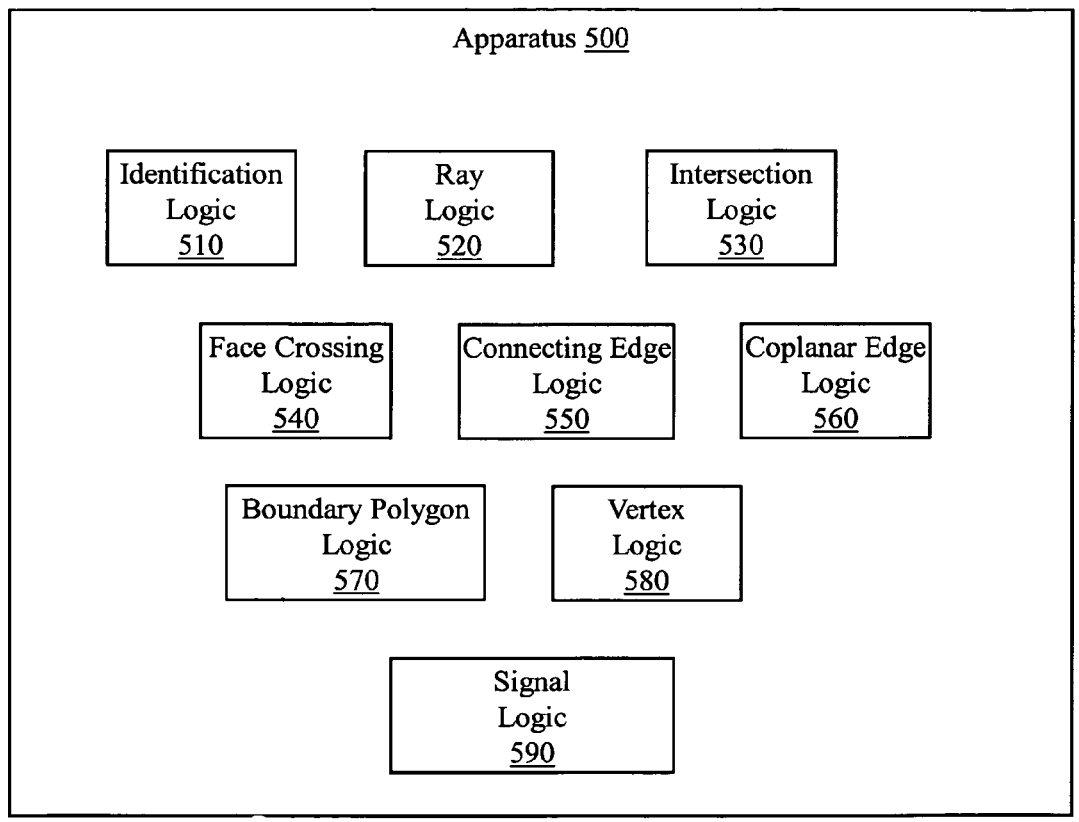
FIG. 5 illustrates an example apparatus associated with determining whether a point is inside a polyhedron.

FIG. 5 illustrates an apparatus 500 associated with determining whether a point is in a polyhedron. Apparatus 500 includes several elements similar to those described in connection with apparatus 400 (FIG. 4). For example, apparatus 500 includes an identification logic 510, a ray logic 520, an intersection logic 530, a face crossing logic 540, a connecting edge logic 550, a coplanar edge logic 560, and a signal logic 590. However, apparatus 500 includes some additional elements.

For example, system 500 includes a boundary polygon logic 570. In one example, boundary polygon logic 570 is to selectively provide a signal indicating that the point is outside the solid polyhedron upon determining that the point is part of a member of the set of boundary polygons. In another example, boundary polygon logic 570 is to selectively provide a signal that the point is inside the solid polyhedron upon determining that the point is part of a member of the set of boundary polygons. In yet another example, the signal provided by boundary polygon logic 570 can be configured by a user.

Apparatus 500 also includes a vertex logic 580. In one example, vertex logic 580 is to selectively provide a signal indicating that the point is outside the solid polyhedron upon determining that the point is a vertex of the solid polyhedron. In another example, vertex logic 580 is to selectively provide a signal indicating that the point is inside the solid polyhedron upon determining that the point is a vertex of the solid polyhedron. In yet another example, the signal provided by vertex logic 580 can be configured by a user.

Figure 6:
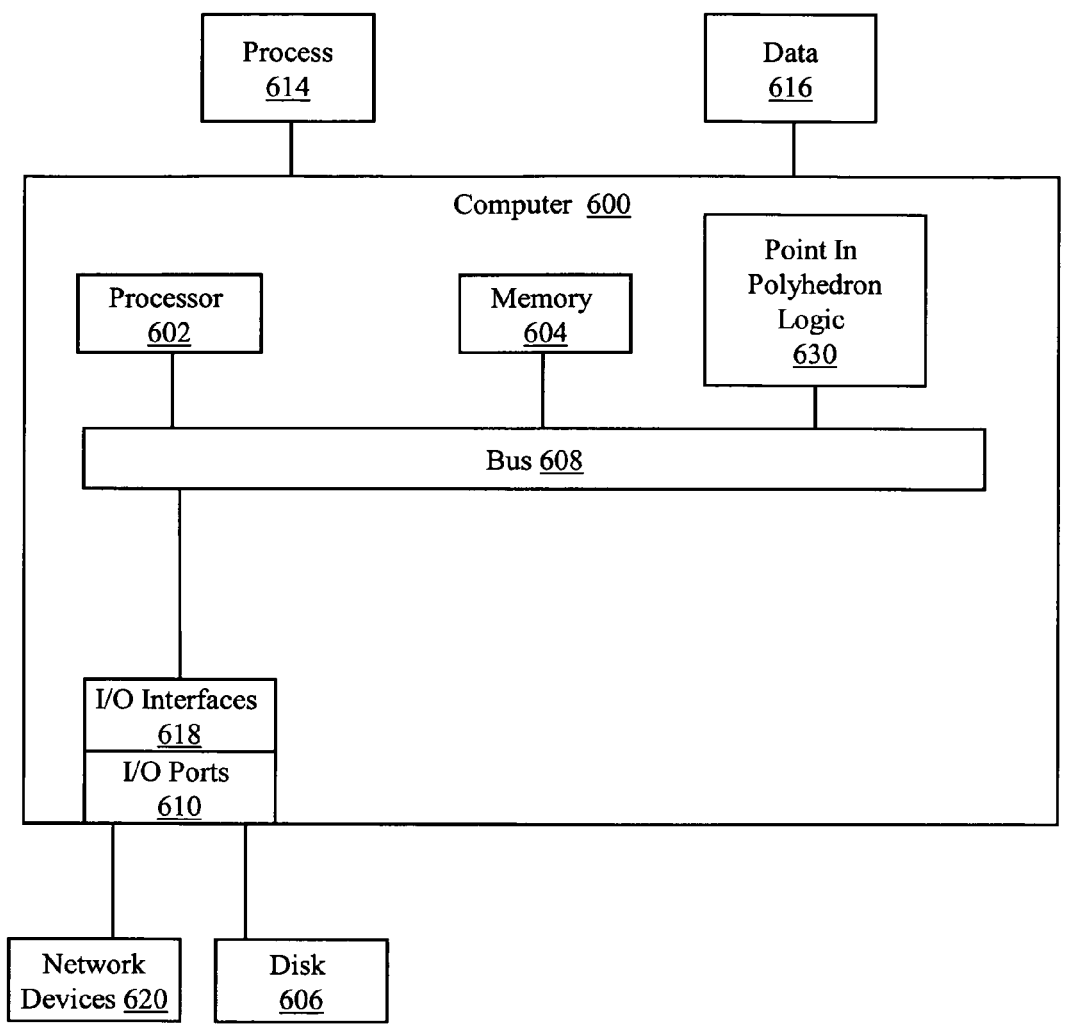
FIG. 6 illustrates an example computing environment in which example systems and methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608.

In one example, the computer 600 may include a point in polyhedron logic 630 configured to facilitate determining whether a point is in a polyhedron. The point and polyhedron may be represented by SDO_GEOMETRY objects, for which a spatial index may be stored in an R-tree. In different examples, the logic 630 may be implemented in hardware, software, firmware, and/or combinations thereof. While the logic 630 is illustrated as a hardware component attached to the bus 608, it is to be appreciated that in one example, the logic 630 could be implemented in the processor 602.

Logic 630 may provide means (e.g., hardware, software, firmware) for acquiring data concerning a point and a solid polyhedron. In different examples the data may be acquired from a file, from a procedure call, from an object, and other locations. Logic 630 may also provide means-(e.g., hardware, software, firmware) for defining a ray from the point to a second point located outside the solid polyhedron. The ray is not to intersect any vertex of the solid polyhedron. In different examples the means may include a combination of an indeterminate random process for producing the ray and a deterministic vertex avoiding process for producing the ray. Logic 630 may also provide means (e.g., hardware, software, firmware) for determining whether the point is inside the solid polyhedron based on a number of faces of the polyhedron crossed by the ray. The means for determining may identify a coplanar face in the solid polyhedron upon determining that the ray intersects with and is coplanar with the coplanar face. The means may then consider whether two faces of the solid polyhedron that are joined by the coplanar face are on the same side of a plane defined by the coplanar face. The means associated with logic 630 may be implemented, for example, as an ASIC. The means may also be implemented as computer executable instructions that are presented to computer 600 as data 616 that are temporarily stored in memory 604 and then executed by processor 602.

Generally describing an example configuration of the computer 600, the processor 602 may be a variety of various processors including dual microprocessor and other multiprocessor architectures. A memory 604 may include volatile memory and/or non-volatile memory. Non-volatile memory may include, for example, ROM, PROM, and so on. Volatile memory may include, for example, RAM, SRAM, DRAM, and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM drive, a Blu-Ray drive, an HD-DVD drive, and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, MB, MBB, AABBC, MBBCC, and so on (e.g., the data store may store only A, only B, only C, A&B, A&C, B&C, A&B&C, A&A&A, A&A&B, A&A&B&B, A&A&B&B&C, A&A&B&B&C&C, and so on). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium storing computer-executable instructions that when executed by a computer cause the computer to perform a method, the method comprising:
    identifying a query point to analyze, where the query point is identifiable in a three dimensional space;
    identifying a solid polyhedron to analyze, the solid polyhedron being identifiable in the three dimensional space, the solid polyhedron comprising a set of boundary polygons represented as a set of planar faces in the three dimensional space, where a member of the set of planar faces has at least one edge in common with at least one other member of the set of planar faces;
    producing a vertex avoiding ray from the query point to a point outside the minimum bounding volume of the solid polyhedron by:
        identifying a reference line that includes the query point and that is parallel to one axis in the three dimensional frame of reference associated with the solid polyhedron;
        producing a set of lines $L_1$ through $L_N$, N being an integer equal to the number of vertices of the solid polyhedron, where a line $L_x$ connects the query point to a vertex $V_x$ of the solid polyhedron;
        computing a set of angles $A_1$ through $A_N$, where an angle $A_x$ describes an angle between a line $L_x$ and the reference line;
        identifying an angle $A_{NOT}$ that is not in the set of angles $A_1$ through $A_N$; and
        establishing the vertex avoiding ray as a ray that begins at the query point and travels in the direction described by $A_{NOT}$;
    initializing a count of crossing intersections to an initial value;
    manipulating the count of crossing intersections based, at least in part, on the vertex avoiding ray and a set of intersections; and
    providing a signal that indicates whether the query point is inside the solid polyhedron based, at least in part, on the count of crossing intersections.

2. The non-transitory computer-readable medium of claim 1, where the query point is represented by an SDO_GEOMETRY point object and where the solid polyhedron is represented by an SDO_GEOMETRY solid object.

3. The non-transitory computer-readable medium of claim 2, where the SDO_GEOMETRY solid object stores a set of information describing surface boundaries of the solid polyhedron.

4. The non-transitory computer-readable medium of claim 3, where identifying the set of intersections includes analyzing the SDO_GEOMETRY point object and the SDO_GEOMETRY solid object using the ANY_INTERACT function.

5. The non-transitory computer-readable medium of claim 4, where the ANY_INTERACT function processes a spatial index of SDO_GEOMETRY objects stored in an R-tree.

6. The non-transitory computer-readable medium of claim 1, the method including:
    selectively providing a signal indicating that the query point is outside the solid polyhedron upon determining that the query point is inside a member of the set of boundary polygons; and
    selectively providing a signal indicating that the query point is outside the solid polyhedron upon determining that the query point is a vertex of the solid polyhedron.

7. The non-transitory computer-readable medium of claim 1, the method including:
    identifying a random point outside the minimum bounding volume of the solid polyhedron;
    producing a random ray from the query point to the random point;
    selectively controlling the method to produce the vertex avoiding ray upon determining that the random ray intersects a vertex of the solid polyhedron, and
    selectively establishing the random ray as the vertex avoiding ray upon determining that the random ray does not intersect a vertex of the solid polyhedron.

8. The non-transitory computer-readable medium of claim 1, where for members of the set of intersecting points, the method further including:
    selectively manipulating the count of crossing intersections to indicate that a crossing intersection has been encountered upon determining that a member of the set of intersecting points is on a member of the set of planar faces but not on an edge of a member of the set of planar faces;

selectively manipulating the count of crossing intersections to indicate that a crossing intersection has been encountered upon determining that a member of the set of intersecting points is on an edge connecting two connected members of the set of planar faces and upon determining that the two connected members of the set of planar faces are not on the same side of a plane defined by the vertex avoiding ray R and the connecting edge; and selectively manipulating the count of crossing intersections to indicate that a crossing intersection has been encountered upon determining that the vertex avoiding ray is coplanar with a member of the set of planar faces and upon determining that a first member of the set of planar faces and a second member of the set of planar faces that are connected by the coplanar face are not on the same side of a plane defined by the coplanar face.

9. The non-transitory computer-readable medium of claim 8, where determining that the two connected members of the set of planar faces are not on the same side of a plane defined by the vertex avoiding ray and the connecting edge includes:

computing a first compass deflection from the query point to a non-edge point in a first of the two connected members of the set of planar faces;

computing a second compass deflection from the query point to a non-edge point in a second of the two connected members of the set of planar faces; and determining whether the first compass deflection and the second compass deflection are in the same relative direction with respect to the plane defined by the vertex avoiding ray and the connected edge.

10. The non-transitory computer-readable medium of claim 8, where determining that the first member of the set of planar faces and the second member of the set of planar faces that are connected by the coplanar face are not on the same side of a plane defined by the coplanar face includes:

centering a sphere at the member of the set of intersecting points that lies on the coplanar face and on an edge of one of the first member of the set of planar faces and the second member of the set of planar faces;

partitioning the sphere into two hemispheres using the coplanar face;

selecting a first non-edge point in the first member of the set of planar faces;

selecting a second non-edge point in the second member of the set of planar faces; and determining whether the first non-edge point and the second non-edge point are in the same hemisphere of the sphere.

11. The non-transitory computer-readable medium of claim 8, where determining that the first member of the set of planar faces and the second member of the set of planar faces that are connected by the coplanar face are not on the same side of a plane defined by the coplanar face includes:

computing a first compass deflection from the query point to a non-edge point in the first member of the set of planar faces;

computing a second compass deflection from the query point to a non-edge point in the second member of the planar faces; and determining whether the first compass deflection and the second compass deflection are in the same relative direction with respect to the plane defined by the coplanar face.

12. The non-transitory computer-readable medium of claim 1, where the query point is represented by a point object and where the solid polyhedron is represented by a set of information describing surface boundaries of the solid polyhedron.

13. The non-transitory computer-readable medium of claim 12, where identifying the set of intersections includes analyzing the point object and the set of information describing surface boundaries of the solid polyhedron using a function to process a spatial index of data describing geometry objects stored in an R-tree.

14. An apparatus, comprising:
a memory;
a processor; and
an interface configured to connect the processor, the memory, and a set of logics, the set of logics including:
an identification logic configured to access data that identifies a point and a solid polyhedron, where the solid polyhedron is defined by a set of boundary polygons represented as a set of planar faces in a three dimensional space, where a member of the set of planar faces has at least one edge in common with at least one other member of the set of planar faces, and where the apparatus is to determine whether the point is located in the solid polyhedron;
a ray logic configured to produce a vertex avoiding ray that starts at the point and travels to another point located outside the minimum bounding volume of the solid polyhedron;
an intersection logic configured to identify a set of intersecting points where the vertex avoiding ray intersects a member of the set of planar faces and to initialize a number of crossing intersections;
a connecting edge logic to selectively update the number of crossing intersections based on a determination of whether a member of the set of intersecting points is on a connecting edge of two connected members of the set of planar faces and whether the two connected members of the set of planar faces are not on the same side of a plane defined by the vertex avoiding ray and the connecting edge; where the connecting logic is configured to determine whether a member of the set of intersecting points is on a connecting edge of two connected members of the set of planar faces and whether the two connected members of the set of planar faces are not on the same side of a plane defined by the vertex avoiding ray and the connecting edge by:
computing a first compass deflection from the point to a non-edge point in a first of the two connected members of the set of planar faces;
computing a second compass deflection from the point to a non-edge point in a second of the two connected members of the set of planar faces; and
determining whether the first compass deflection and the second compass deflection are in the same relative direction with respect to the plane defined by the vertex avoiding ray and the connected edge; and
a signal logic configured to provide a signal that identifies whether the point is located in the solid polyhedron based, at least in part, on the number of crossing intersections associated with the set of intersecting points.

15. The apparatus of claim 14, including a boundary polygon logic configured to selectively provide a signal indicating that the point is outside the solid polyhedron upon determining that the point is part of a member of the set of boundary polygons.

16. The apparatus of claim 15, including a vertex logic configured to selectively provide a signal indicating that the point is outside the solid polyhedron upon determining that the point is a vertex of the solid polyhedron.

17. The apparatus of claim 14, where the point is represented by a point object and where the solid polyhedron is represented by a set of information describing surface boundaries of the solid polyhedron.

18. The apparatus of claim 14, where to produce a vertex avoiding ray that starts at the point and travels to another point located outside the minimum bounding volume of the solid polyhedron, the ray logic is configured to:

- identify a reference line that includes the point and that is parallel to one axis in a three dimensional frame of reference associated with the solid polyhedron;
- produce a set of lines $L_1$ through $L_N$, N being an integer equal to the number of vertices of the solid polyhedron, where a line $L_x$ connects the point to a vertex $V_x$ of the solid polyhedron;
- compute a set of angles $A_1$ through $A_N$, where an angle $A_x$ describes an angle between a line $L_x$ and the reference line;
- identify an angle $A_{NOT}$ that is not in the set of angles $A_1$ through $A_N$; and
- establish the vertex avoiding ray beginning at the point and travelling in the direction described by $A_{NOT}$.

19. The apparatus of claim 14, where the set of logics further includes:

- a face crossing logic configured to selectively update the number of crossing intersections based on a determination of whether a member of the set of intersecting points is on a member of the set of planar faces but is not on an edge of a member of the set of planar faces; and
- a coplanar edge logic configured to selectively update the number of crossing intersections based on a determination of whether a member of the set of intersecting points is on a planar face that is coplanar with the vertex avoiding ray and whether a first member of the set of planar faces and a second member of the set of planar faces that are connected by the coplanar face are not on the same side of a plane defined by the coplanar face.

20. The apparatus of claim 19, where the coplanar edge logic is configured to determine whether a member of the set of intersecting points is on a planar face that is coplanar with the vertex avoiding ray and whether a first member of the set of planar faces and a second member of the set of planar faces that are connected by the coplanar face are not on the same side of a plane defined by the coplanar face by:

- computing a third compass deflection from the point to a non-edge point in the first member of the set of planar faces;
- computing a fourth compass deflection from the point to a non-edge point in the second member of the planar faces; and
- determining whether the third compass deflection and the fourth compass deflection are in the same relative direction with respect to the plane defined by the coplanar face.

\* \* \* \* \*

UNITED STATES PATENT AND TRADEMARK OFFICE
CERTIFICATE OF CORRECTION

| | | |
|---|---|---|
| PATENT NO. | : 8,248,409 B2 | Page 1 of 1 |
| APPLICATION NO. | : 12/287835 | |
| DATED | : August 21, 2012 | |
| INVENTOR(S) | : Kazar et al. | |

It is certified that error appears in the above-identified patent and that said Letters Patent is hereby corrected as shown below:

In column 13, line 41, delete "MB, MBB," and insert -- AAB, AABB, --, therefor.

In column 13, line 42, delete "MBBCC," and insert -- AABBCC, --, therefor.

Signed and Sealed this
Eighteenth Day of December, 2012

David J. Kappos
*Director of the United States Patent and Trademark Office*